Sept. 12, 1933.  J. STASSART  1,926,121
ANIMAL TRAP
Filed June 3, 1932
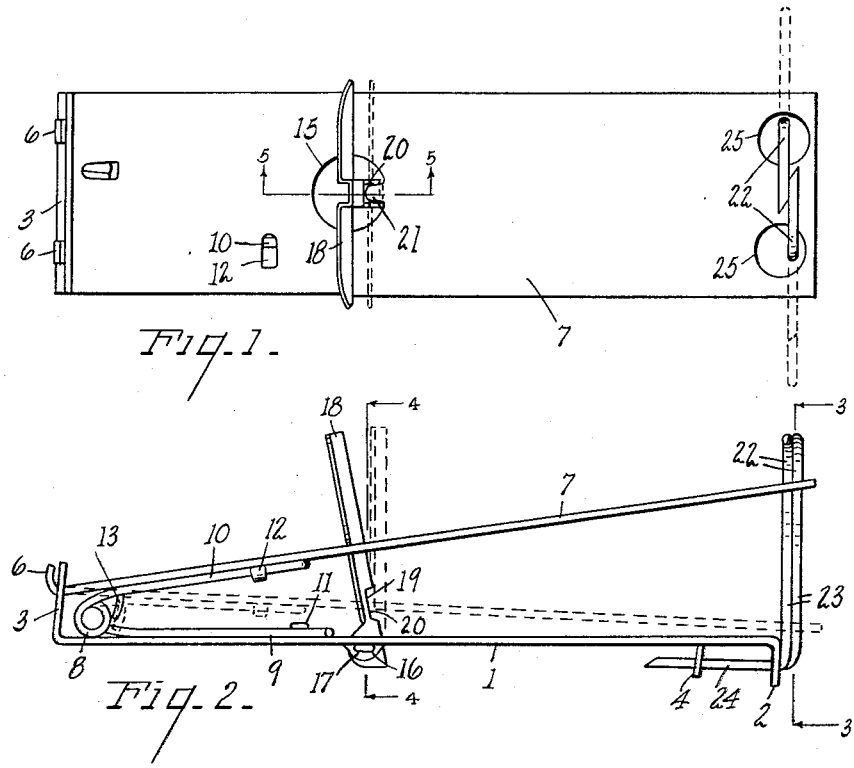
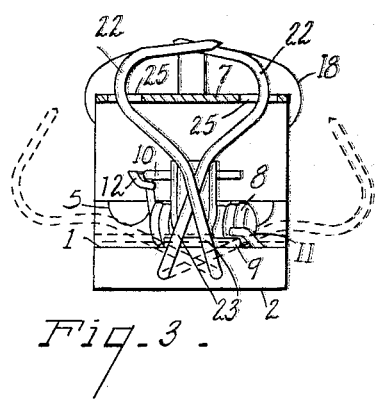
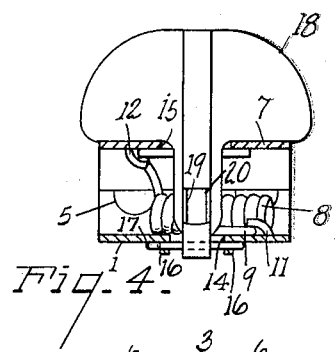
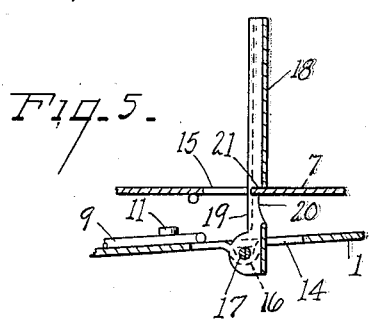
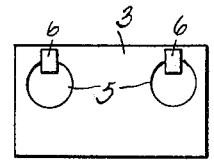
INVENTOR
Joseph Stassart
BY
Chappell Earl
ATTORNEYS Patented Sept. 12, 1933

1,926,121

UNITED STATES PATENT OFFICE 1,926,121

ANIMAL TRAP

Joseph Stassart, Berkeley, Calif., assignor of one-half to Michigan Wire Goods Company, Niles, Mich.

Application June 3, 1932. Serial No. 615,130

11 Claims. (Cl. 43—91)

The main object of this invention is to provide an animal trap for gophers, moles, and other burrowing animals which is highly efficient and at the same time easily "set".

A further object is to provide a structure having these advantages which may be formed of relatively light material and is very economical in its parts.

Objects pertaining to details and economies of my invention will definitely appear from the description to follow. The invention is defined in the claims.

A structure embodying the features of my invention is clearly illustrated in the accompanying drawing, in which:

Fig. 1 is a plan view of my improved animal trap, the set position of the jaws and the tripping pan being indicated by dotted lines.

Fig. 2 is a side elevation, the set position of the spring plate and the tripping pan being shown by dotted lines.

Fig. 3 is a view partially in vertical section on line 3—3 of Fig. 2 showing the parts in set position by dotted lines.

Fig. 4 is a transverse section on line 4—4 of Fig. 2, the tripping pan being shown in full lines.

Fig. 5 is a fragmentary section corresponding to line 5—5 of Fig. 1 with the parts in set position.

Fig. 6 is a rear end view with parts omitted.

The embodiment of my invention illustrated comprises a base member 1 formed as a stamping and having a downturned flange 2 at its front end and an upturned flange 3 at its rear end. A pintle ear 4 is struck downwardly from the base member adjacent the front flange 2. The rear flange 3 has holes 5 therein through which the upturned pivot lugs 6 of the spring plate 7 are disposed, thus providing a pivotal or swinging connection for the spring plate to the base member.

The spring plate is urged yieldingly away from the base member by means of the coiled spring 8 terminating at its ends in arms 9 and 10 of considerable length, the arm 9 resting upon the base and being positioned thereon by means of the lug 11 struck up from the base member. The arm 10 engages the under side of the spring plate and is positioned thereon by means of the lug 12 struck downwardly from the spring plate. A lug 13 struck downwardly from the spring plate engages the coiled portion of the spring, further retaining the spring.

The base member has a hole 14 preferably centrally located, while the spring plate has a hole 15 above the hole 14. Pivot ears 16 are formed on the side edges of the hole 14 to receive the pivot 17, preferably a cotter pin, of the trigger or tripping member 18. This member 18 has a shank portion 19 arranged through the hole 15, the head of the tripping member being above the spring plate and acting to limit the upward movement thereof.

The shank is provided with a hole 20 adapted to receive the lug-like keeper 21 formed on the front edge of the opening 15 so that when the spring plate is pushed downwardly and the tripping pan pushed forwardly the spring plate is locked in set position.

The jaws 22 are preferably formed of wire and are of a general U shape arranged in opposed relation. These jaws have shank portions 23 disposed in crossed relation and terminating in pintles 24 arranged through the flange 2 and the pintle ear 4. The jaws are arranged through holes 25 in the spring plate so that when the spring plate is released and springs upwardly under the action of the spring the jaws are closed. When the spring plate is forced downwardly the jaws drop or swing to their open position shown by dotted lines in Fig. 3.

The trap is designed to be set in the burrow or passage of the animal to be trapped, facing the direction from which it is assumed the animal will come. In passing over the trap the animal disengages the pan and releases the spring plate.

My improved animal trap is very efficient, may be formed of relatively light material, and at the same time is quite strong and durable. I have not attempted to illustrate certain embodiments and adaptations which I contemplate as it is believed that this disclosure will enable those skilled in the art to embody or adapt my improvements as may be desired.

Having thus described my invention what I claim as new and desire to secure by Letters Patent is:

1. An animal trap comprising a base member having an upturned flange at its rear end provided with spaced openings, a downturned flange at its front end, and a downwardly projecting pintle ear adjacent to but spaced from said front flange, said base member having a central opening with downturned pivot ears at the side edges thereof, a spring plate having upturned pivot lugs at its rear end engaged in said openings in said rear flange of said base member, said spring plate having spaced openings at its forward end and a central opening provided with a rearwardly projecting keeper at its front edge, coacting facing jaws disposed through said openings at the front end of said spring plate and having shank portions disposed in crossed relation below said spring plate and terminating in pintles engaged in said front flange and said ear on said base member, a coiled spring arranged between said base member and spring plate at the rear end thereof and having arms at its ends engaging said base member and spring plate, said base member and spring plate having integral lugs in retaining engagement with said arms, said spring plate having a downwardly projecting retaining lug for said spring, and a trip provided with a shank disposed through openings in said base member and spring plate and having an opening adapted to receive said keeper when the spring plate is in its set position, said trip being provided with a pivot engaging said pivot ears on said base member.

2. An animal trap comprising a base member having an upturned flange at its rear end provided with spaced openings, a downturned flange at its front end, and a downwardly projecting pintle ear adjacent to but spaced from said front flange, said base member having a central opening with downturned pivot ears at the side edges thereof, a spring plate having upturned pivot lugs at its rear end engaged in said openings in said rear flange of said base member, said spring plate having spaced openings at its forward end and a central opening provided with a rearwardly projecting keeper at its front edge, coacting facing jaws disposed through said openings at the front end of said spring plate and having shank portions disposed in crossed relation below said spring plate and terminating in pintles engaged in said front flange and said ear on said base member, a spring acting to urge said spring plate upwardly, and a trip provided with a shank disposed through said openings in said base member and spring plate and having an opening adapted to receive said keeper when the spring plate is in its set position, said trip being provided with a pivot engaging said pivot ears on said base member.

3. An animal trap comprising a base member having front and rear flanges and a pintle ear adjacent to but spaced from its front flange, said base member having a central opening with pivot ears at the side edges thereof, a spring plate having a pivot lug at its rear end pivotally engaged with said rear flange of said base member, said spring plate having spaced openings at its forward end and a central opening provided with a keeper at one edge, coacting facing jaws disposed through said openings at the front end of said spring plate and having pintles engaged in said front flange and said adjacent ear on said base member, a coiled spring arranged between said base member and spring plate at the rear end thereof and having arms at its ends engaging said base member and spring plate, said base member and spring plate having integral lugs in retaining engagement with said spring, and a trip provided with a shank disposed through said openings in said base member and spring plate and having an opening adapted to receive said keeper when the spring plate is in its set position, said trip being provided with a pivot engaging said pivot ears on said base member.

4. An animal trap comprising a base member having front and rear flanges and a pintle ear adjacent to but spaced from its front flange, said base member having a central opening with pivot ears at the side edges thereof, a spring plate having a pivot lug at its rear end pivotally engaged with said rear flange of said base member, said spring plate having spaced openings at its forward end and a central opening provided with a keeper at one edge, coacting facing jaws disposed through said openings at the front end of said spring plate and having pintles engaged in said front flange and said adjacent ear on said base member, a spring acting to actuate said spring plate, and a trip provided with a shank disposed through said openings in said base member and spring plate and having an opening adapted to receive said keeper when the spring plate is in its set position, said trip being provided with a pivot engaging said pivot ears on said base member.

5. An animal trap comprising a base member having an upturned flange at its rear end provided with spaced openings, a spring plate having upturned pivot lugs at its rear end engaged in said openings, a coiled spring arranged between said base member and spring plate at the rear end thereof and having arms at its ends engaging said base member and spring plate, said base member and spring plate having integral lugs in retaining engagement with said arms, said spring plate having a downwardly projecting retaining lug for said spring, a tripping member, means operatively associating said tripping member with said base and spring plate for holding said spring plate in set position, jaws mounted on said base member, and means operatively associating said jaws with said spring plate whereby they are actuated to closed position when the spring plate is released.

6. An animal trap comprising a base member having an upturned flange at its rear end, a spring plate having pivot lugs at its rear end engaged with said flange, a coiled spring arranged between said base member and spring plate at the rear end thereof and having arms at its ends engaging said base member and spring plate, said base member and spring plate having integral lugs in retaining engagement with said spring, a tripping member, means operatively associating said tripping member with said base and spring plate for holding said spring plate in set position, jaws mounted on said base member, and means operatively associating said jaws with said spring plate whereby they are actuated to closed position when the spring plate is released.

7. An animal trap comprising a base member having a front flange and a pintle ear adjacent said front flange, a spring plate pivotally mounted on said base member at its rear end and having a pair of spaced openings at its front end, a spring acting to actuate said spring plate, coacting facing U-shaped jaws disposed through said openings in said spring plate and having crossed shank portions below said spring plate terminating in pintles engaged in said flange and pintle ear, and a trip member pivotally mounted on said base member to project above said spring plate, said trip member having a recess, and said spring plate having a keeper with which said trip member coacts when the spring plate is in set position.

8. An animal trap comprising a base member having a front flange and a pintle ear adjacent said front flange, a spring plate pivotally mounted on said base member at its rear end and having a pair of spaced openings at its front end, a spring acting to actuate said spring plate, coacting facing U-shaped jaws disposed through said openings in said spring plate and having pintles engaged in said flange and pintle ear, and a trip member mounted on said base plate to project above said spring plate, said trip member having a recess, and said spring plate having an opening through which said trip member extends and a keeper with which the recess in said trip member coacts when the spring plate is in set position.

9. An animal trap comprising a base member, a spring plate pivotally mounted at the rear end of said base member, said base member and spring plate having alined openings, said base member having pivot ears at the side edges of its openings, said spring plate having a keeper at the front edge of its opening, a pan provided with a shank disposed through said openings, said shank being provided with a pivot engaged with said pivot ears, the shank having an opening adapted to receive said keeper when the spring plate is in set position, coacting jaws pivotally mounted on said base member, and means associated with the front end of said spring plate acting to hold said jaws in open position when the spring plate is in set position and to actuate said jaws to closed position when the spring plate is released.

10. An animal trap comprising a base member having a front flange, a spring plate pivotally mounted on said base member at its rear end and having a pair of spaced openings at its front end, a spring acting to actuate said spring plate, coacting facing U-shaped jaws disposed through said openings in said spring plate and having crossed shank portions pivotally engaged with said flange, and a trip pivotally mounted on said base plate to project above said spring plate, said trip having a recess, and said spring plate having an opening through which said trip extends and a keeper with which the recess in said trip coacts when the spring plate is in set position.

11. An animal trap comprising a base member, a spring plate pivotally mounted at the rear end of said base member and having an opening with a keeper at the front edge thereof, a trip disposed through said opening, and pivotally mounted on said base member, said trip having means adapted to receive said keeper when the spring plate is in set position, coacting jaws pivotally mounted on said base member, and means associated with the front end of said spring plate acting to hold said jaws in open position when the spring plate is in set position and to actuate said jaws to closed position when the spring plate is released.

JOSEPH STASSART.